US010053049B1

(12) United States Patent
Carter

(10) Patent No.: US 10,053,049 B1
(45) Date of Patent: Aug. 21, 2018

(54) HEAD RESTRAINT APPARATUS

(71) Applicant: Robert Carter, Naperville, IL (US)

(72) Inventor: Robert Carter, Naperville, IL (US)

( * ) Notice: Subject to any disclaimer, the term of this patent is extended or adjusted under 35 U.S.C. 154(b) by 0 days.

(21) Appl. No.: 15/926,828

(22) Filed: Mar. 20, 2018

(51) Int. Cl.
*B60R 22/00* (2006.01)
*A47C 7/38* (2006.01)
*B64D 11/06* (2006.01)
*B61D 33/00* (2006.01)
*B60R 22/26* (2006.01)
*B60N 2/24* (2006.01)

(52) U.S. Cl.
CPC .............. *B60R 22/001* (2013.01); *A47C 7/38* (2013.01); *A47C 7/383* (2013.01); *B61D 33/005* (2013.01); *B64D 11/062* (2014.12); *B60N 2/242* (2013.01); *B60R 22/26* (2013.01)

(58) Field of Classification Search
CPC .......... B60R 22/001; A47C 7/38; A47C 7/383
See application file for complete search history.

(56) References Cited

U.S. PATENT DOCUMENTS

| | | |
|---|---|---|
| 1,712,198 A | 5/1929 | Clapp |
| 2,726,714 A | 12/1955 | Mcandrews |
| 4,339,151 A | 7/1982 | Riggs |
| 4,707,031 A | 11/1987 | Meistrell |
| 5,378,042 A * | 1/1995 | Daneshvar ............. A47C 7/383 297/393 |
| 6,266,825 B1 | 7/2001 | Floyd |
| 6,301,716 B1 | 10/2001 | Ross |
| 6,607,245 B1 | 8/2003 | Scher |
| 6,799,802 B1 | 10/2004 | Moran |
| 6,805,403 B2 | 10/2004 | Buch |
| 7,004,545 B2 | 2/2006 | Miller |
| 7,628,456 B1 * | 12/2009 | Swartz ................... A47C 7/383 297/393 |
| 7,740,318 B2 | 6/2010 | Funke, III |
| 7,832,802 B2 | 11/2010 | Ehlers |
| 7,909,406 B2 | 3/2011 | Samuelsen |
| 8,381,316 B2 | 2/2013 | Edwards |

(Continued)

FOREIGN PATENT DOCUMENTS

| | | |
|---|---|---|
| WO | 1995001114 | 1/1995 |
| WO | 2000038946 | 7/2000 |

(Continued)

*Primary Examiner* — Timothy J Brindley
(74) *Attorney, Agent, or Firm* — Law Offices of Konrad Sherinian

(57) ABSTRACT

A head restraint device for improving quality of sleep inside passenger carriers includes a seat attachment assembly and a head restraint assembly including two elastic straps that are attached to the seat strap of the attachment assembly. The restraint assembly includes two adjusters coupled to the two elastic straps respectively, two head straps adjustably attached to the two adjusters, a face strap permanently attached to one head strap and attached to the other head strap via a loop and hook fastener. The two adjusters allow the face strap placed at center and the device to fit heads of different sizes. The face strap of bigger width provides better eye coverage and comfort. The restraint assembly restrains the movement of a head while the elastic straps absorb head motion and keep the passenger sleeping. The attachment assembly includes an adjuster for tightly attaching the device to a seat back or headrest.

1 Claim, 4 Drawing Sheets

(56) References Cited

U.S. PATENT DOCUMENTS

| | | |
|---|---|---|
| 8,662,590 B2 | 3/2014 | Bogen |
| 8,726,419 B2 | 5/2014 | Vahey |
| 9,233,632 B2 | 1/2016 | Edwards |
| 9,272,177 B2 | 3/2016 | Befeld |
| 9,364,369 B2 | 6/2016 | Van Stone |
| 9,572,718 B2 | 2/2017 | Sternlight |
| 9,751,438 B2 | 9/2017 | Dunham |
| 9,795,219 B1 | 10/2017 | Gracie |
| 2005/0268377 A1 | 12/2005 | Massey |
| 2009/0236893 A1 | 9/2009 | Ehlers |
| 2009/0271904 A1 | 11/2009 | Bentley |
| 2010/0283310 A1 | 11/2010 | Blackwood |
| 2011/0031799 A1 | 2/2011 | Dejoode |
| 2011/0271421 A1 | 11/2011 | Vahey |
| 2012/0068515 A1* | 3/2012 | Bogen .................... B60N 2/882 297/393 |
| 2013/0020853 A1 | 1/2013 | Gibson |
| 2013/0031697 A1 | 2/2013 | Woda |
| 2014/0051557 A1 | 2/2014 | Befeld |
| 2015/0061340 A1 | 3/2015 | Fleming |
| 2015/0173346 A1 | 6/2015 | Bartolomucci |
| 2015/0203009 A1 | 7/2015 | Swearingen |
| 2015/0257538 A1* | 9/2015 | MacDougall .......... B60N 2/882 297/217.1 |
| 2015/0328039 A1 | 11/2015 | Van Stone |
| 2016/0297331 A1* | 10/2016 | Friedman ............. B60N 2/2851 |
| 2017/0050547 A1 | 2/2017 | Dunham |
| 2017/0135861 A1* | 5/2017 | Sternlight .............. B60N 2/882 |
| 2018/0002021 A1* | 1/2018 | Smith .................... B60N 2/882 |

FOREIGN PATENT DOCUMENTS

| | | |
|---|---|---|
| WO | 2010129652 | 11/2010 |
| WO | 102458190 | 5/2012 |
| WO | 2017005949 | 1/2017 |

* cited by examiner

HEAD RESTRAINT APPARATUS

CROSS REFERENCE TO RELATED APPLICATIONS

None.

FIELD OF THE DISCLOSURE

The present invention generally relates to travel accessories, and more particularly relates to a travel accessory for improving the travel experience for a passenger. More particularly still, the present disclosure relates to a head restraint apparatus for improving sleeping quality of air plane, train, bus and car passengers.

DESCRIPTION OF BACKGROUND

Each day, millions of people travel by air planes, trains, buses and cars (collectively referred to herein as passenger carriers). Many passengers spend multiple hours inside air planes during a single trip. Oftentimes, they desire to have a good sleep while sitting in their seats. The passengers have the option of tilting their seat backs backward for better rest. However, due to limited space on air planes and other types of passenger carriers, the seat backs at the reclined position are still substantially upright. With their backs in an upright or close to upright orientation, people cannot sleep well. For instance, their heads often make a sudden forward nodding motion that can wake them up when they attempt to sleep in passenger carriers. As another example, in such a situation, their heads tend to tilt left or right. The side tilting causes neck pain. It also causes passengers to tilt their body left or right and thus interfere with neighboring passengers.

Accordingly, there is a need for a new head restraint device that restrains the range of motion of a passenger's head while the passenger is sleeping. The new head restraint device needs to absorb shock that is created when the passenger's head nods forward or tilts to side while still provides sleep comfort for the passenger. Furthermore, the new head restraint device needs to fit seat backs of different sizes. Moreover, the new head restraint device needs to fit seat headrests of different sizes as well. In addition, the new head restraint device needs to function with different types of seat headrests.

OBJECTS OF THE DISCLOSED SYSTEM, METHOD, AND APPARATUS

Accordingly, it is an object of this disclosure to provide a new head restraint apparatus.

Another object of this disclosure is to provide a head restraint device that limits a passenger's head's forward motion.

Another object of this disclosure is to provide a head restraint device that limits a passenger's head's lateral motion.

Another object of this disclosure is to provide a head restraint device that absorbs the shock produced by motion of a passenger's head without the passenger being awakened by the motion.

Another object of this disclosure is to provide a head restraint device that absorbs the shock produced by the forward nodding of a passenger's head during sleep.

Another object of this disclosure is to provide a head restraint device that absorbs the shock produced by the forward nodding of a passenger's head without the passenger being awakened by the nodding.

Another object of this disclosure is to provide a head restraint device that can be attached to a seat back at different positions without any modifications to the seat back.

Another object of this disclosure is to provide a head restraint device that can be used with seat backs of different sizes.

Another object of this disclosure is to provide a head restraint device that can be used with both seat backs and seat headrests.

Another object of this disclosure is to provide a head restraint device that can be used with seat headrests of different sizes.

Another object of this disclosure is to provide a head restraint device that can be used with both seat backs and foldable seat headrests.

Another object of this disclosure is to provide a head restraint device that saves materials without sacrificing the benefits of comfort and ability to cover a passenger's eyes.

Another object of this disclosure is to provide a head restraint device that includes a seat attachment assembly and a head restraint assembly.

Another object of this disclosure is to provide a head restraint device that incorporates two head strap adjusters for keeping a face strap at center for maximum comfort.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a head restraint device. The head restraint device includes a seat attachment assembly operatively attachable to a resting anchor at different positions on the resting anchor, and a head restraint assembly attached to the seat attachment assembly. The head restraint assembly is adjustable and adapted to restrain a range of motion of a passenger's head when the passenger is sleeping. The resting anchor is a seat back or a seat headrest of a seat of an air plane, a train, a bus or a car. The resting anchor can be a foldable seat headrest having a right wing, a central body and a left wing. The seat attachment assembly includes a head base strap. The head restraint assembly and the head base strap are adapted to enclose the foldable headrest and the passenger's head.

The seat attachment assembly includes a seat strap adjuster and a seat strap. One end of the seat strap is permanently attached to the seat strap adjuster and the other end of the seat strap is adapted to be detachably attached to the seat strap adjuster to cause the seat attachment assembly to become tightly attached to the resting anchor. The head restraint assembly includes a first elastic strap permanently attached to the seat strap, a second elastic strap permanently attached to the seat strap, a first head strap, a first head strap adjuster connecting the first elastic strap and the first head strap, a second head strap, a second head strap adjuster connecting the second elastic strap and the second head strap, a face strap attached to the second head strap, and a fastener adapted to attach the face strap to the second head strap. The fastener can be a hook and loop fastener, such as a Velcro fastener. The fastener is positioned at a front right side or a front left side of the head restraint assembly. In one construction, the second head strap and the face strap are integrally formed. In one implementation, the face strap is wider than the first and second head straps for provide better comfort and eye coverage for the passenger. In a further implementation, the head restraint assembly includes a sleeve adapted to enclose the face strap for better comfort.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
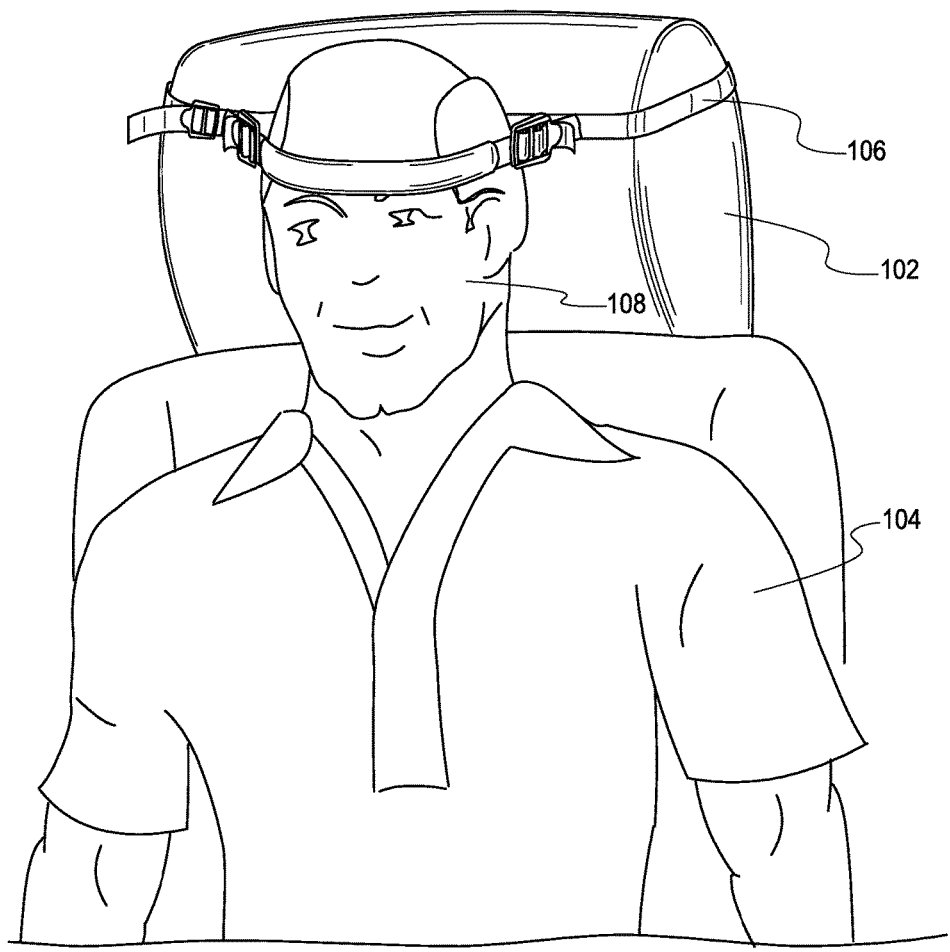
FIG. 1 is a front perspective view of a head restraint device adjustably attached to a seat and enclosing the head of a passenger in accordance with this disclosure.

Turning to the Figures and to FIG. 1 in particular, a new head restraint device is shown and generally indicated at 106. The head restraint device 106 is attached to a seat back 102 and encloses the head 108 of a passenger 104. In one embodiment, the seat back 102 is part of a passenger seat of an air plane or an different type of passenger carriers. The head restraint device 106 is portable since it is attached to the seat back 102 and can be easily detached from the seat back 102. It is thus said to be detachably attached to the seat back 102 when it is attached to the seat back 102. Moreover, the head restraint device 106 is adjustably attached to seat back 102. It incorporates a strap adjuster to allow the head restraint device 106 to be tightly attached to the seat back 102 and thus prevents movement of the seat attach assembly on the seat back 102. The strap adjuster allows the head restraint device 106 to be tightly attached to the seat back 102 at different heights. Accordingly, the head restraint device 106 fits passengers of different heights. Furthermore, the head restraint device 106 can be attached to seat backs of different sizes. The head restraint device 106 is further illustrated by reference to FIGS. 2 and 3.

Figure 2:
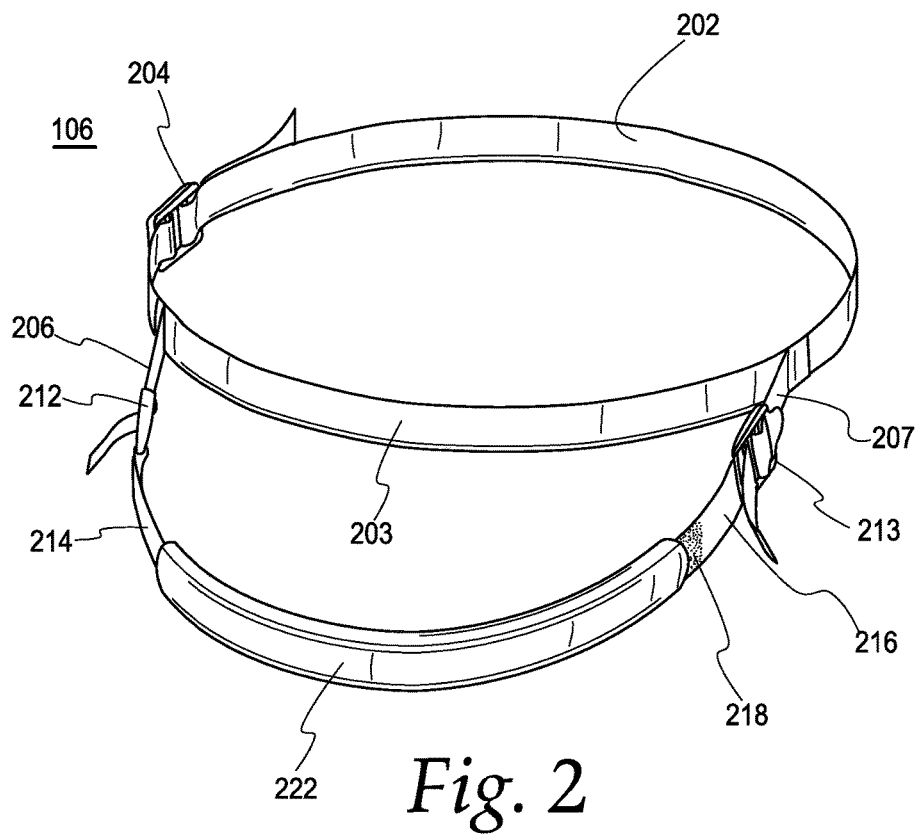
FIG. 2 is a front perspective view of a head restraint device in accordance with this disclosure.

Referring now to FIG. 2, a perspective view of the head restraint device 106 is shown. The head restraint device 106 includes a seat strap 202, a seat strap adjuster 204, two elastic straps 206 and 207, two head straps 214 and 216, two head strap adjusters 212 and 213, a face strap sleeve 222 and a face strap disposed inside the face strap sleeve 222. One end of seat strap 202 is attached to the seat strap fastener 204. In one implementation, the seat strap 202 is permanently attached to the seat strap adjuster 204 by sewing. The other end of the seat strap 202 is detachably attached to the seat strap adjuster 204. As used herein, the seat strap 202 is said to be operatively coupled to the seat strap adjuster 204.

To adjustably attach the head restraint device 106 to the seat back 102, a user wraps the strap 202 around the seat back 102, operatively attaches the open end of the seat strap 202 to the seat strap fastener 204, places the seat strap 202 at a desirable position on the seat back 102, and tightens the seat strap 202 around the seat back 102 by operating the open end of the seat strap 202 and the seat strap adjuster 204. As used herein the seat strap 202 and the seat strap fastener 204 are collectively referred to as a seat attachment assembly. The seat attachment assembly is adjustably attached to the seat back 102 or a seat headrest because it can be placed at a height of the user's choice. The seat back 102 and the seat headrest are also referred to herein as resting anchors. As used herein, the seat attachment assembly is said to be operatively attachable to a resting anchor. Furthermore, it can be attached to resting anchors of different perimeters. In one implementation, the seat strap 202 is a polypropylene webbing of about one inch in width. It should be noted that that the seat strap 202 can be made of different flexible materials or of a different width without deviating from the present teachings.

The elastic straps 206 and 207 are permanently attached to the seat strap 202. For example, the elastic straps 206 and 207 are sewed to the seat strap 202. The portion of the seat strap 202 between the elastic straps 206 and 207 is referred to herein as a head base strap and indicated at 203. On the opposite ends, the elastic straps 206 and 207 are permanently attached to the head strap adjusters 212 and 213 respectively. In one implementation, the elastic straps 206 and 207 are wrapped around respective frames of the head strap adjusters 212 and 213 and sewn to themselves.

The head straps 214 and 216 are detachably attached to the head strap adjusters 212 and 213 respectively. The head strap 214 can be attached to the adjuster 212 at different points on the head strap 214. Similarly, the head strap 216 can be attached to the adjuster 213 at different points on the head strap 216. A passenger assembles the head restraint 106 by attaching the head straps 214 and 216 to the head strap adjusters 212 and 213 respectively. The head strap 214 is permanently attached to a face strap. The face strap is further illustrated by reference to FIG. 3.

Figure 3:
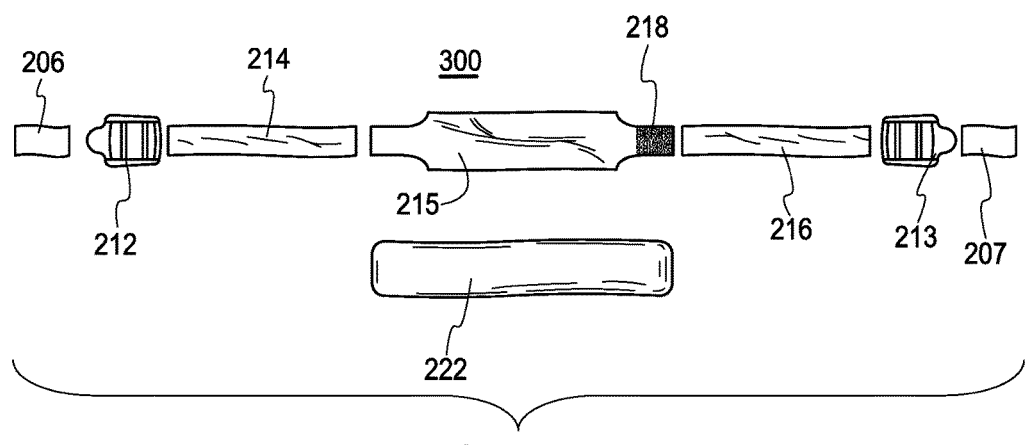
FIG. 3 is an exploded view of a head restraint device in accordance with this disclosure.

Turning to FIG. 3, an exploded view of a head restraint assembly of the head restraint apparatus 106 is shown and generally indicated at 300. The head restraint assembly includes the elastic straps 206-207, the head strap adjusters 212-213, the head straps 214 and 216, and the face strap 215. In one implementation, the head strap 214 is permanently attached to the face strap 215 by sewing. The face strap 215 also incorporates a first member of the fastener 218 while the head strap 216 incorporates a corresponding member of the fastener 218. The fastener 218 connects the head strap 216 to the face strap 215. In one implementation, the fastener 218 is a hook and loop fastener, such as a Velcro® fastener. In a further implementation, the Velcro® fastener 218 has a release force of thirty five pounds or higher. Usually, a human head weighs between 10 and 11 pounds. The upper limit of the force the head produces at three times of gravity ("3G Force") is about 30 to 33 pounds. Accordingly, the fastener's 218 release force of 35 or higher can safely protects the passenger 104 when the head's sudden movement generates 3G Force.

The fastener 218 provides the benefit of easy and convenient operation of the head restraint assembly 300. The passenger 104 operates the fastener 218 to place the head restraint assembly 300 around the head 108. The passenger 104 also operates the fastener 218 to take off the head restraint assembly 300 from the head 108. The head strap adjusters 212-213 and the fastener 218 make the head restraint device 106 an adjustable head restraint device.

In one implementation, the face strap 215 is constructed wider than the head straps 214 and 216. The wider face strap 215 provides the benefit of more comfort to the user. Moreover, the wider face strap 215 provides the benefit of covering the passenger's 104 eyes from lighting inside passenger carrier and thus affords higher sleeping quality to the passenger 104.

In operation, the passenger 104 can operate the head straps 214 and 216 and the head strap adjusters 212 and 213 to adjust the perimeter of the head restraint assembly 300 to fit the size of the head 108. The adjustable head restraint assembly 300 allows the passenger 104 to sleep inside it comfortably. Moreover, the two head strap adjusters 212 and 213 provide the benefit of placing the face strap 215 approximately at center. This benefit allows the passenger's 104 face to be in touch with the wider face strap 215 only and thus maximizes comfort to the passenger 104.

In a further implementation, the head restraint assembly 300 includes a sleeve 222 enclosing the face strap 215. The sleeve 222 is made of soft materials, such as cotton to provide more comfort to the passenger 104. When used, the sleeve 222 makes direct contact with the passenger's 104 face. In such a case, the face strap 215 is also said to be in contact with the passenger's 104 face.

When in operation, the head restraint assembly 300 encloses the head 108. The elastic straps 206-207 absorb the shock produced by the forward nodding motion of the head 108. Accordingly, the head restraint assembly 300 provides the benefits of allowing a small range of movement of the head 108 and not awaking the passenger 104. The small range improves sleeping quality and comfort. The elastic straps 206-207 also absorb the shock produced when the head 108 moves left or right when the passenger 104 sleeps. They prevent the passenger 104 from waking up when the head moves during sleep. The elastic straps 206-207 thus provide the function of a suspension system. Furthermore, the elasticity of the elastic straps 206-207 provides the advantage of not having to operate the adjusters 212-213 and the fastener 218 when the passenger 104 pulls the face strap (or the sleeve 222) to cover the passenger's 104 eyes or pulls it up to leave the eyes exposed. Without the elastic straps 206-207, moving the fact strap 215 over or away from the eyes would cause discomfort when the head restraint assembly 300 tightly wraps around the head 108. It should be noted that the passenger 104 can always operate the Velcro 218 for better fit when the face strap 215 is intended to cover or expose the eyes. The fastener 218 is positioned at the front left side for ease of operation. It should be noted that the fastener 218 is can be positioned at the front right side to provide the same ease of operation.

Furthermore, for most passenger carrier seats, the length of the head base strap 203 is shorter than the width of the seat back 102 at the position where the seat strap 202 is attached to the seat back 102. In such cases, the head restraint assembly 300 reduces the range of lateral movement of the head 108. The limitation improves sleeping quality and prevents the passenger 104 from waking up when the head 108 makes lateral movement. The head restraint assembly 300 keeps the head 108 at substantially the same position when the passenger 104 sleeps. It should be noted that, with the seat attachment assembly tightly attached to the seat back 102, the head restraint device 106 does not move up or down the seat back 102 when the passenger 104 moves. Accordingly, the head restraint device 106 does not move from a desired position even when the head 108 moves during the passenger's 104 sleep.

The head restraint device 106 is also reversible because it can be used with the elastic strap 206 and the head strap 214 on the left side or the right side of the head 108. The reversibility of the head restraint device 106 provides the advantage that a user does not have to determine the left and rights sides of the head restraint device 106. Furthermore, when the fastener 204 cannot be disposed on a certain side, the head restraint device 106 can be simply reversed and used.

Figure 4:
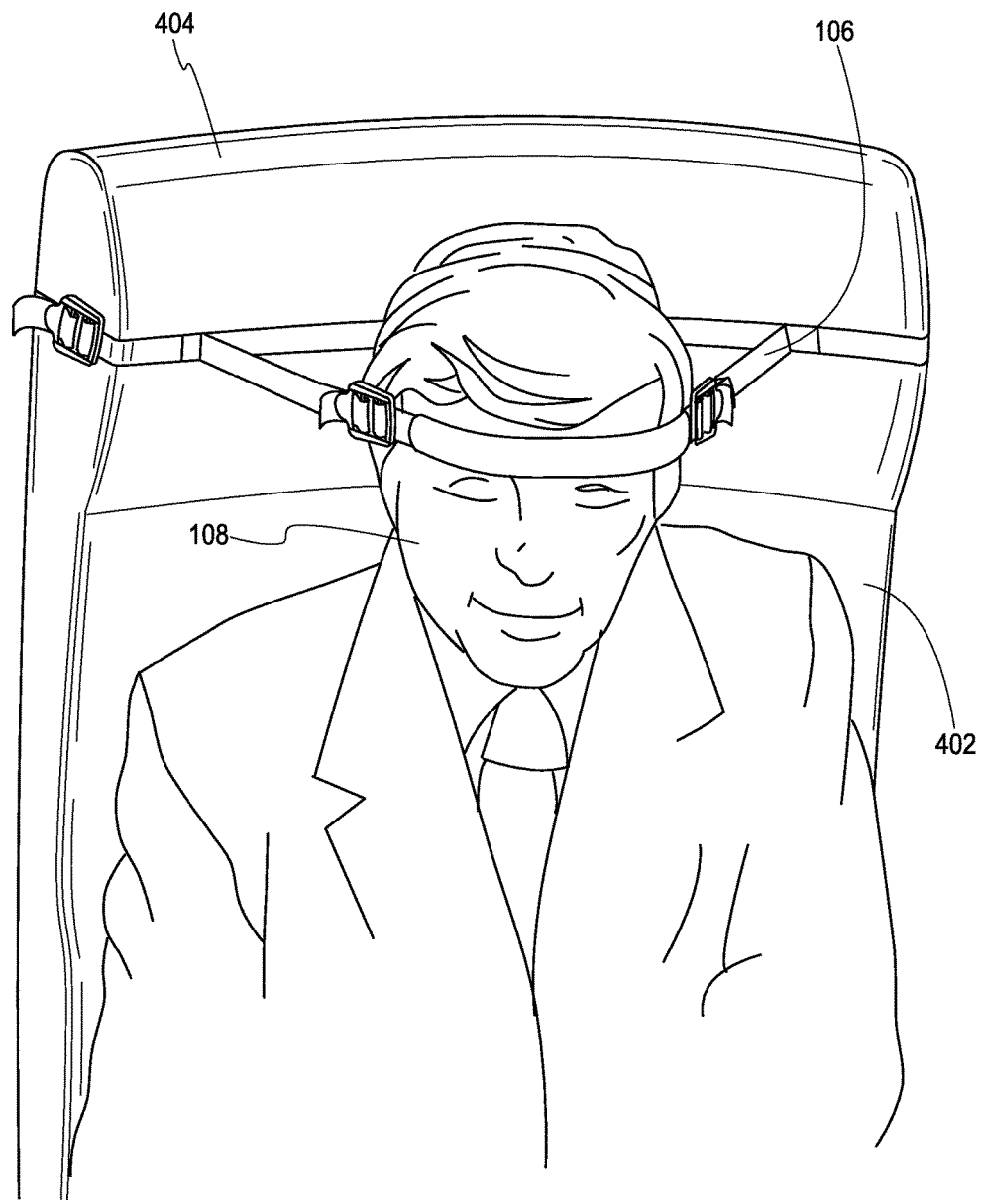
FIG. 4 is a front perspective view of a head restraint device adjustably attached to a seat headrest and enclosing the head of a passenger in accordance with this disclosure.

Some seats incorporate headrests. The head restraint device 106 can also be attached to headrests. As shown in FIG. 4, the head restraint device 106 is attached to a headrest 404 of a seat back 402. The headrest 404 is illustrated as affixed to the seat 402. Alternatively, the headrest 404 can be extensible from the seat 402. For example, the extensive headrest 404 is a car sear headrest that can be extended away from the seat 402 for taller passengers. Some headrests are foldable to reduce lateral movements of passengers' heads. A foldable headrest with the head restraint device 106 attached is shown in FIG. 5.

Figure 5:
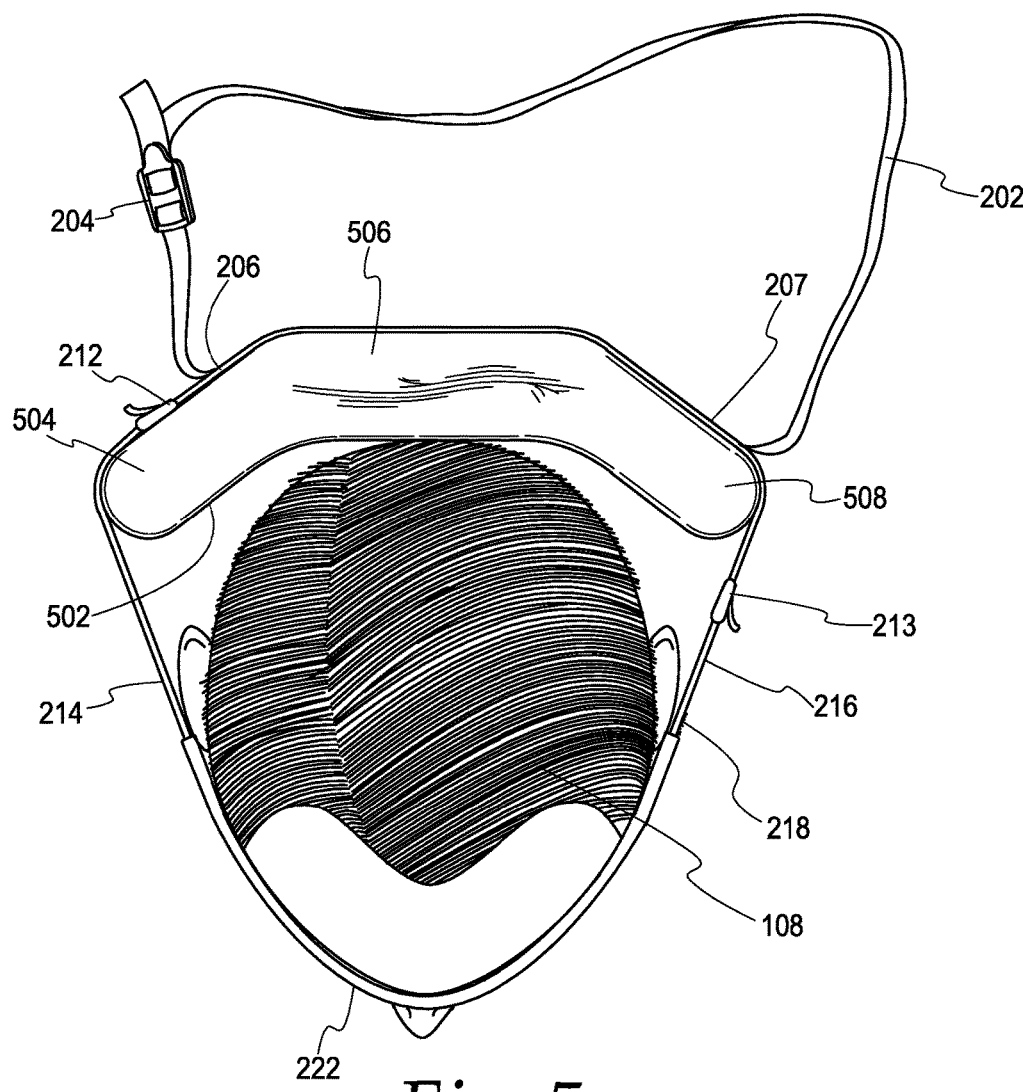
FIG. 5 is a top view of a head restraint device adjustably attached to a seat headrest and enclosing the head of a passenger in accordance with this disclosure.

Referring to FIG. 5, a top view of the head restraint device 106 attached to a foldable headrest 502 and enclosing the head 108 is shown. The foldable headrest 502 includes a right wing 504, a central body 506 and a left wing 508. When the headrest 502 is not folded, the right wing 504, the central body 506 and the left wing 508 are in a substantially linear orientation. In other words, the right wing 504, the central body 506 and the left wing 508 form a substantially flat surface to receive the head 108. When folded, the perimeter of an enclosure encompassing the head 108 and the headrest 502 is smaller than when the headrest 502 is not folded. In such a case, the head base strap 203 would be substantially parallel to the central body 506 and create a space between the head 108 and the body 506. In other words, the head 108 would not be able to rest against the central body 506 due to the space.

The head restraint device 106 solves this problem with the head restraint assembly 300 and the head base strap 203 attached to the foldable headrest 502 and wrapping around the head 108 while the seat strap 202 hangs loose. Accordingly, the head restraint device 106 provides the advantage of fitting seat backs, seat headrests and foldable seat headrests. It should be noted that the headrest 502 may not be foldable, and the right wing 504, the central body 506 and the left wing 508 are in a rigid formation as shown in FIG. 5. In such a case, as used herein, the headrest 502 is also referred to as a foldable headrest.

Figure 6:
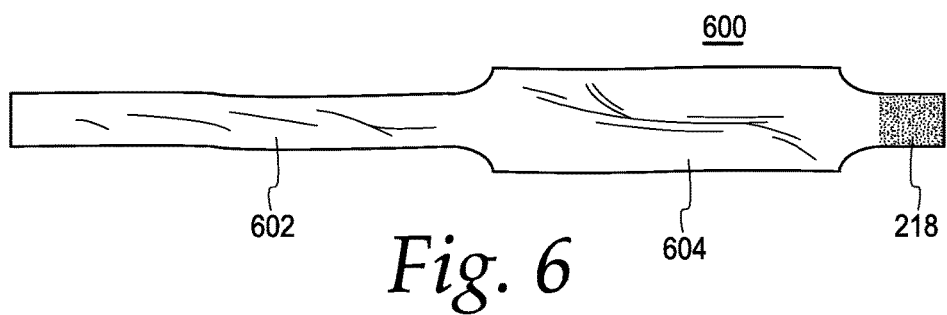
FIG. 6 is a front view of a head strap and a face strap of a head restraint device in accordance with this disclosure.

Obviously, many additional modifications and variations of the present disclosure are possible in light of the above teachings. Thus, it is to be understood that, within the scope of the appended claims, the disclosure may be practiced otherwise than is specifically described above. For example, the head strap 214 and the face strap 215 are integrally formed as a single piece as shown in FIG. 6 and generally indicated at 600. The wider portion 604 of the strap 600 is equivalent to the face strap 215 while the thinner portion 602 of the strap 600 is equivalent to the head strap 214. In one implementation, the head straps 214 and 216 are about one inch wide while the face strap 215 is about two inch wide. They can be made of, for example, polypropylene. The width difference provides the advantage of saving materials, keeping the head restraint device 106 light and ease of operation without sacrificing comfort and eye coverage provided by the head restraint apparatus 106. In alternate embodiments, the straps 214-216 can be of substantially the same width. In such a case, not all the above mentioned benefits will be present.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A head restraint device comprising:
   i. a seat attachment assembly operatively attachable to a resting anchor at different positions on said resting anchor;
   ii. a head restraint assembly attached to said seat attachment assembly, wherein said head restraint assembly is adjustable and adapted to restrain a range of motion of a passenger's head when said passenger is sleeping;
   iii. wherein said seat attachment assembly includes a seat strap adjuster and a seat strap, wherein one end of said seat strap is permanently attached to said seat strap adjuster and the other end of said seat strap is adapted to be detachably attached to said seat strap adjuster to cause said seat attachment assembly tightly attached to said resting anchor;
   iv. wherein said head restraint assembly includes a first elastic strap permanently attached to said seat strap, a second elastic strap permanently attached to said seat strap, a first head strap, a first head strap adjuster connecting said first elastic strap and said first head strap, a second head strap, a second head strap adjuster connecting said second elastic strap and said second head strap, a face strap attached to said second head strap, and a fastener adapted to attach said face strap to said second head strap; and
   v. wherein said first head strap and said face strap are integrally formed.

* * * * *